Aug. 14, 1928.
C. B. SPASE
1,680,751
CLUTCH
Filed Nov. 19, 1924
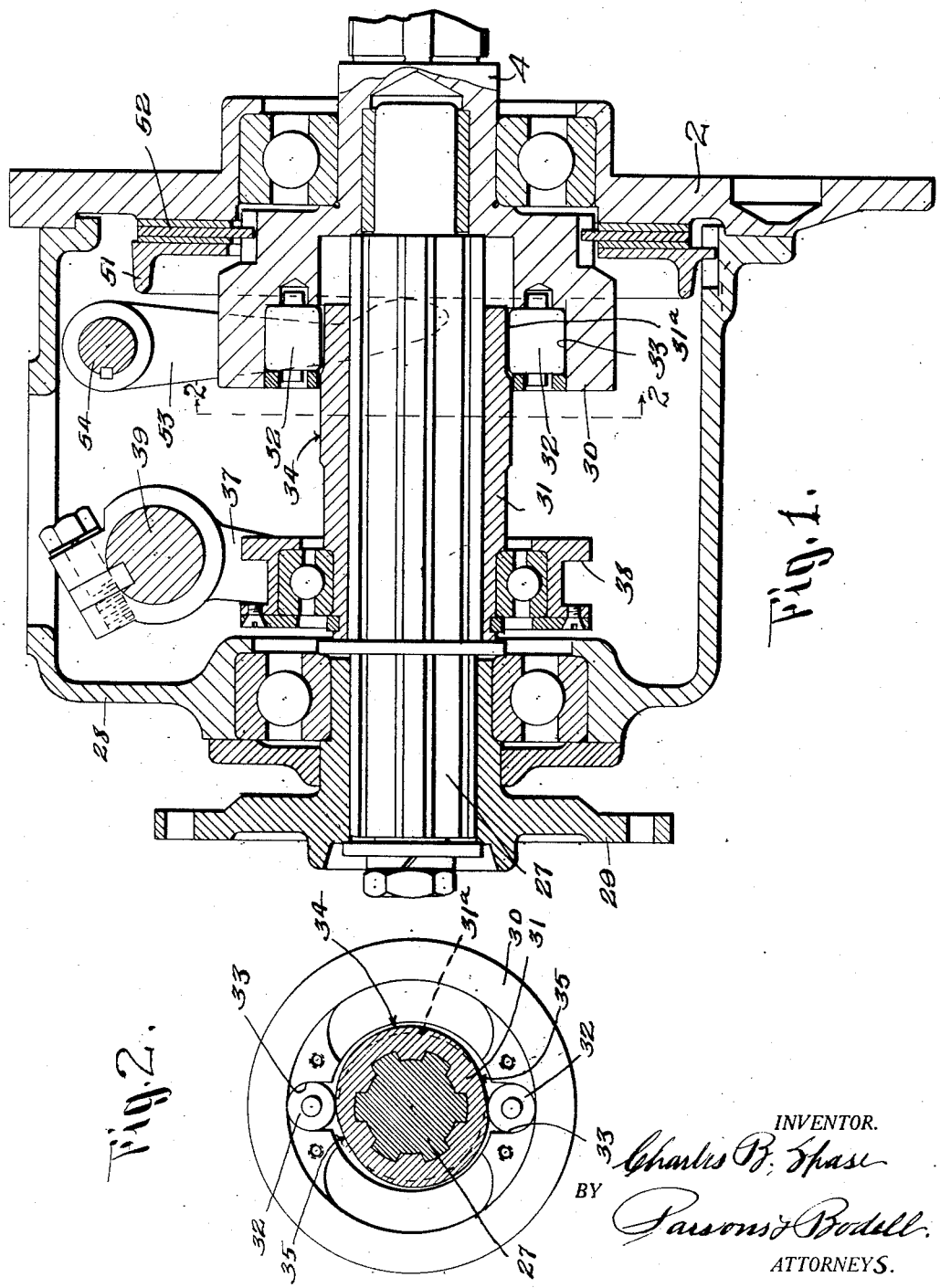

Patented Aug. 14, 1928.

1,680,751

UNITED STATES PATENT OFFICE.

CHARLES B. SPASE, OF SYRACUSE, NEW YORK, ASSIGNOR TO BROWN-LIPE GEAR COMPANY, OF SYRACUSE, NEW YORK, A CORPORATION OF NEW YORK.

CLUTCH.

Application filed November 19, 1924. Serial No. 750,945.

This invention relates to motion transmitting mechanisms such as are used in motor vehicles to transmit the power of the engine to the driving wheels or rear axle and has for its object a particularly simple and efficient auxiliary or rear clutch for disconnecting the transmission gearing from the propeller shaft preliminary to gear shifting operations in order that the gear shifting may take place when the gears are idle or when there is no force applied tending to turn them.

The invention consists in the novel features and in the combinations and constructions hereinafter set forth and claimed.

In describing this invention, reference is had to the accompanying drawings in which like characters designate corresponding parts in all the views.

Figure 1 is a sectional view of the rear or auxiliary clutch and contiguous parts.

Figure 2 is a sectional view on line 2—2, Figure 1.

27 is a propeller shaft driver which is arranged in axial alinement with the driven shaft 4 of the transmission gearing and has a pilot bearing at one end therein and is journaled at its other end in a bearing provided in a casing 28 forming a part of, or attached to, the rear end of the gear casing 2. The propeller shaft driver is connected to the propeller shaft by a suitable universal joint, one section of which is shown at 29.

The rear or auxiliary clutch between the driven shaft 4 and the propeller shaft driver 27 is of the roller type of clutch and includes a head or section 30 mounted on or formed integral with the outer or rear end of the shaft 4, and a section 31 rotatable with the shaft 27 and connectors between the sections 30 and 31, these connectors being movable outwardly and inwardly in a radial direction and such movement being effected by a relative axial movement of the sections 30 and 31.

Preferably, the section 31 is shiftable axially and is here shown as in the form of a sleeve slidable axially of the propeller shaft driver 27 and splined thereto, the inner end of the sleeve extending into the section 30. The connectors are here shown as rollers 32 arranged to ride on a cylindrical concentric peripheral surface 31ª on the sleeve 31 and movable into radial sockets 33 in the section 30. As the propeller shaft driver rotates in opposite directions, that is, in one direction to drive the car forward and in the other direction to drive the car rearward, the roller clutch must act in opposite directions and therefore the sockets 33 extend in a substantially radial direction. The sleeve 31 is also formed with a cam circumferential surface 34 eccentrically arranged relatively to the axis of the shaft 27 and arranged adjacent the cylindrical surface and merging at diametrically opposite points 35 thereinto.

When the roller clutch is "off," the rollers ride on the concentric cylindrical surface and the parts are in their position shown in Figure 1.

Upon shifting of the sleeve 31 to the right, the eccentric surfaces 34 are moved under the rollers and hence during relative rotation of the shafts 4 and 27, the rollers ride up on the eccentric or cam surfaces or the cam surfaces ride under the rollers, forcing the rollers outwardly into the sockets 33 until the rollers are wedged in such sockets and thus form a positive connection between the clutch sections 30 and 31.

The clutch section 31 is shifted by any suitable means as a shifter arm 37 coacting with a collar 38 on the sleeve 31, this arm 37 being mounted on a rock shaft 39 journaled in the case 28 and extending to the outside thereof.

The rock shaft 39 is actuated from the front clutch pedal of the vehicle in any suitable manner to be operated in sequence or in synchronism with the front or main clutch.

In operation, the throwing out of the main clutch by depressing the clutch pedal rocks the shaft 39 to move the section or sleeve 31 of the rear clutch to the left carrying the cylindrical surface under the rollers 32 so that the rollers 32 are free to roll or rather so that the clutch section 30 will roll about the sleeve 31 or the section 31 roll in the head 30, thus disconnecting the transmission gearing from the propeller shaft. Thus, the transmission gearing is disconnected at its front end from the engine and at its rear end from the propeller shaft, so that there is no propelling force on the gears of the transmission gearing during the gear shifting operation.

When the main clutch pedal is released, the rear clutch is first engaged by the movement of the section 31 to the right carrying the eccentric surfaces 34 under the rollers 32 so that the rollers are wedged into the sockets 33 before the main clutch is fully engaged.

Also, I have shown a brake arranged to retard the rotation of the gears of the gearing when the rear clutch is disengaged. This brake forms no part of my invention. It consists generally of a pressure ring 51 arranged to compress a brake disk 52 interlocked with the clutch section 30, against a friction face on the rear wall of the gear case 2. This pressure ring 51 is operated by a rock arm or fork 53 mounted on a rock shaft 54 journalled in the case 28 and extending to the outside thereof, and having a rock arm at its outer end so connected with the control means for the rear clutch that when the rear clutch is engaged, the brake is released and when the rear clutch is disengaged, the brake is applied.

What I claim is:

1. A transmission mechanism comprising shafts arranged in axial alinement, one of which drives the other, a clutch between the shafts including wedging means arranged to come into positive engagement gradually, said wedging means including outer and inner elements, the outer element having a radially extending passage, a roller in the passage and the inner element having a cam for gradually moving the roller radially in the passage into final wedging engagement with the outer end wall of the passage and the inner member being shiftable to carry the wedging means into and out of operative position relatively to the roller.

2. A transmission mechanism comprising shafts arranged in axial alinement, one of which drives the other, a clutch between the shafts including wedging means arranged to come into positive engagement gradually, the wedging means including an outer element having a radially extending passage, an axially shiftable inner element having a cylindrical portion and a cam portion, the cam portion being elliptical in general form with its sides substantially coincident with the periphery of the cylindrical portion and a roller located in said passage and arranged to engage the cylindrical portion and the elliptical portion upon shifting of the elliptical portion into the outer element.

In testimony whereof, I have hereunto signed my name, at Syracuse, in the county of Onondaga, in the State of New York, this 12th day of November, 1924.

CHARLES B. SPASE.